Aug. 20, 1957     F. R. LOHMAN     2,803,210
RAPID SOLDERING RING STICK
Filed Aug. 17, 1956
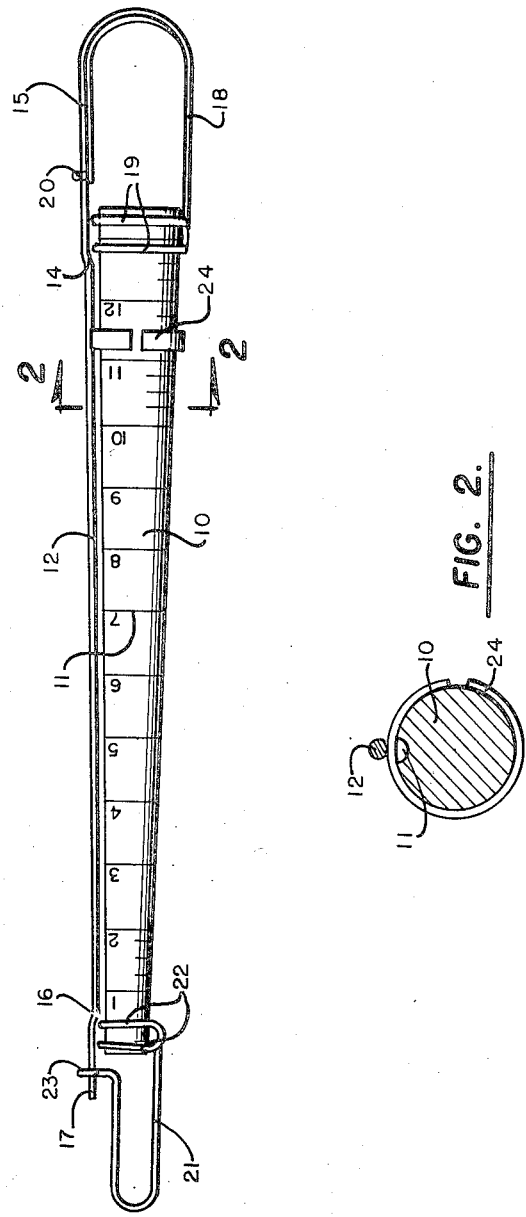
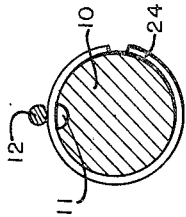
*INVENTOR*
*Frederick R. Lohman*

2,803,210
RAPID SOLDERING RING STICK

Frederick R. Lohman, Olympia, Wash.

Application August 17, 1956, Serial No. 604,769

4 Claims. (Cl. 113—111)

This invention relates to soldering ring sticks.

Conventional asbestos soldering sticks rough up and fuzzy asbestos gets into the joints. Before long the soldering stick is bumpy and worn out. Furthermore, such asbestos ring sticks can be used only with torches.

It is accordingly a principal object of the present invention to provide a rapid sizing and soldering ring stick which overcomes the above disadvantages of conventional asbestos soldering sticks.

Other objects of the invention are to provide a rapid soldering ring stick bearing the above objects in mind which is of simple construction, has a minimum number of parts, is inexpensive to manufacture and efficient in operation and use.

For other objects and for a better understanding of the invention, reference may be had to the following detailed description taken in connection with the accompanying drawing, in which:

Figure 1 is a top plan view of a preferred embodiment of the present invention; and Fig. 2 is a transverse sectional view thereof taken along the line 2—2 of Fig. 1.

Referring now more in detail to the drawing, 10 represents a fire clay ring stick of elongated, frusto-conical shape and of varying circular cross section, the ring stick 10 being provided with the graduations or scale 11, substantially as illustrated. The ring stick 10 may be provided with the longitudinally extending groove 11'.

An elongated contact rod 12 of drawn copper wire is provided, being outwardly bent as at 13 and formed with the hook shaped portion 15. The other end of the contact rod 12 is formed with the outwardly bent portion 16 which terminates in the tip 17.

A U-shaped stress spring 18 of drawn copper wire is provided, one end of the stress spring extending beyond the other and being formed with the double loop portions 19, at right angles thereto and of slightly smaller diameter interiorly than the largest end of the ring stick 10. The other end of the stress spring 18 terminates short of the loops 19 in the eye 20.

A second U-shaped stress spring 21 is provided one side of the stress spring 21 extending beyond the end of the other and terminating in the double loop portion 22 adapted to fit onto the smaller end of the ring stick 10, as shown in Fig. 1. The other side of the stress spring 21 terminates short of the double loops 22 in the laterally bent eye 23.

The ring stick may be assembled for use with electric soldering by pushing the small end of the stick 10 through the double looped portion 19 of the stress spring 18, as shown in Fig. 1. The cut ring 24 to be sized is spread slightly, and the ends are filed with a three corner file whereupon the ring 24 is moved to the desired size. As shown in Fig. 2, the ends of the ring 24 are filed so as to present a triangular opening therebetween. The ends of the piece of gold, not shown, are shaped to fit the cut ends of the ring 24, leaving about one-fourth of the size tension when placed on the clay stick 10 to solder, this tension holding the piece of gold in place. The hooked end 17 of the contact rod 12 is held up from the stick 10 while the other end thereof is pushed through the eye 20 of the stress spring 18. The stress spring 21 is then pressed onto the smaller end of the stick 10, as shown in Fig. 1, and while still holding the hooked end 17 of the contact rod up, this end is fitted gently in the eye 23 of the stress spring 21. When the operator is sure the contact rod 12 is properly in place, the hooked end 15 of the contact rod is pulled down so as to lock with the stress spring 18, as shown in Fig. 1, whereupon the clamp of the soldering machine is fastened over both wires at the large end of the stick 10. After the piece to be soldered has been fitted in place on the ring 24, cotton wrapped on the end of a wooden peg may be wet with flux and used to dampen the piece of solder and the ring. The solder is then placed over the joint and the carbon pencil of the soldering machine, not shown, is gently but firmly placed over the solder on the joint and rolled gently lengthwise of the ring as the foot pedal of the machine is pressed until the solder flows well, the machine being set at the proper heat. The stick may be used as well with a torch without electric attachments by applying heat from either side. Gold may be pushed under the joint or placed on top, proceeding as above.

While various changes may be made in the detail construction, it shall be understood that such changes shall be within the spirit and scope of the present invention as defined by the appended claims.

What I claim as new and desire to protect by Letters Patent of the United States is:

1. A soldering ring stick comprising an elongated ring stick of refractory material, said stick being of substantially elongated frusto-conical shape of varying cross section circular shape, said stick being provided with a longitudinally extending scale, an elongated wire of conductive material having an outwardly bent tip at one end, said contact rod at the other end being outwardly bent and terminating in a substantially hook-shaped portion extending beyond the end of the ring stick, a first stress spring of conductive material of substantially U-shape, means for releasably connecting one end of said stress spring to the larger end of said ring stick, means for releasably engaging said stress spring with the hook-shaped end of said contact rod, a second stress spring of substantially U-shape, means for releasably connecting said second stress spring to the smaller end of said ring stick and means for releasably engaging said second stress spring with the other end of said contact rod.

2. A soldering ring stick according to claim 1, said means releasably connecting said first stress spring to the larger end of said ring stick comprising one side of said first stress spring extending beyond the other side and terminating in a double looped portion of slightly smaller diameter interiorly than the largest end of the ring stick and adapted to receive the same therethrough.

3. A soldering ring stick according to claim 2, said means for releasably engaging the said first stress spring with the hooked end of said contact rod comprising the other side of said first stress spring terminating short of said double looped portion in an eye receiving said contact rod therewithin in resilient engagement.

4. A soldering ring stick according to claim 3, said releasable means for mounting said second stress spring on the smaller end of said ring stick comprising one side of said second stress spring extending beyond the other and terminating in a double looped portion adapted to be press-fitted onto the smaller end of said ring stick adjacent the outwardly bent tip of said contact rod, said means for releasably engaging the outwardly bent tip of said contact rod with said second stress spring comprising the other side of said second stress spring terminating short of said double looped portion in a laterally bent eye receiving said tip therewithin.

References Cited in the file of this patent

UNITED STATES PATENTS

| | | |
|---|---|---|
| 506,234 | Hinsey | Oct. 10, 1893 |
| 1,450,452 | Randall | Apr. 3, 1923 |
| 2,102,546 | Schatz | Dec. 14, 1937 |